April 8, 1924.

H. ADELMANN

HAM BOILER

Filed Jan. 14, 1921

1,489,969

WITNESSES
W. G. Jones
Robert D. Hulsizer

INVENTOR
HANS ADELMANN
BY
ATTORNEYS

Patented Apr. 8, 1924.

1,489,969

UNITED STATES PATENT OFFICE.

HANS ADELMANN, OF NEW YORK, N. Y., ASSIGNOR TO HAM BOILER CORPORATION, OF NEW YORK, N. Y., A CORPORATION OF NEW YORK.

HAM BOILER.

Application filed January 14, 1921. Serial No. 437,256.

*To all whom it may concern:*

Be it known that I, HANS ADELMANN, a citizen of Germany, and a resident of the city of New York, borough of Bronx, in the county of Bronx and State of New York, have invented a new and Improved Ham Boiler, of which the following is a full, clear, and exact description.

This invention relates to meat-cooking appliances and has particular reference to ham boilers or the like of the general type covered in my United States Patent, No. 1,272,883, issued July 16, 1918, entitled Ham boiler.

An object of the invention is to improve the operation of ham boilers, whereby said operation is more convenient with respect to the manipulation of the meat and much more rapid with respect to the means for inserting and removing the meat from the boiler.

Another object of the invention resides in the provision of means whereby the expansion of the meat during cooking is more accurately compensated for in the adjustment of the parts during the cooking.

A further object resides in the particular construction and arrangement of parts hereinafter described and claimed and shown in the accompanying drawings.

The invention is illustrated in the drawings, in which—

Figure 1:
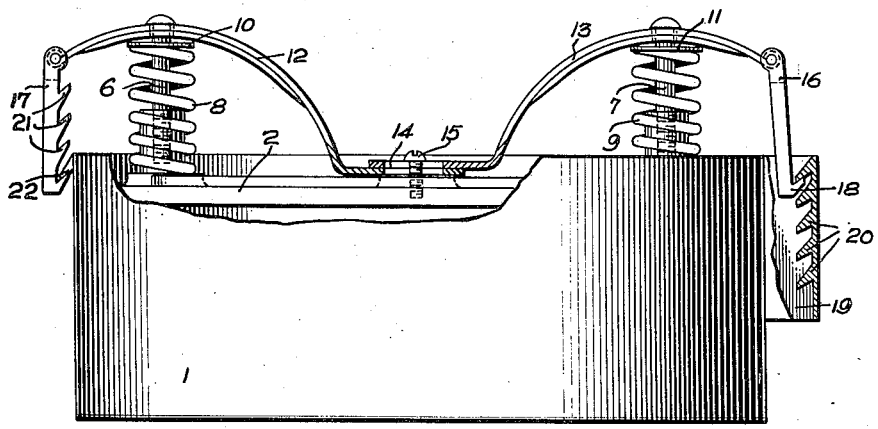
Figure 1 represents a side view of the device with a portion of the boiler casing or receptacle broken away to show the construction of the adjustable cover.
Figure 2:
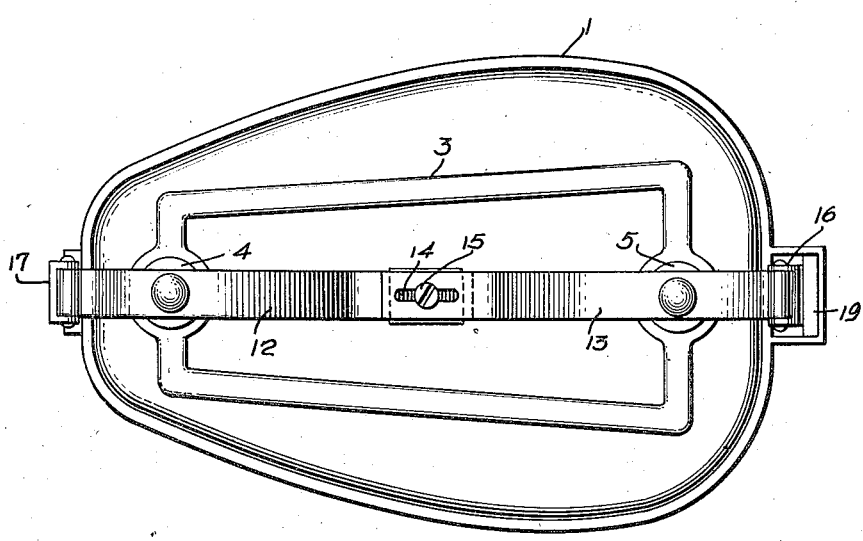
Figure 2 is a plan view of the device.
Figure 3:
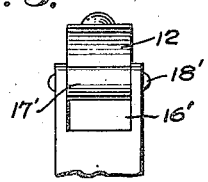
Figure 3 is a detail.

As shown in the drawings, the invention comprises a receptacle or body portion 1 of any desired size and shape having an open upper end within which an adjustable cover 2 is adaped to move. This cover portion 2 is provided with strengthening ribs 3. The cover portion 2 and the body portion 1 may be made of any suitable sheet metal, which may be stamped out in the desired form. At opposite ends of and on the upper face of the cover portion 2 are vertically extending bosses 4 and 5 into which bolts 6 and 7 are screwed. Disposed around the bosses 4 and 5 and the bolts 6 and 7 are spiral springs 8 and 9 the lower ends of which bear against the cover portion 2 and the upper ends of which bear against the under faces of washers 10 and 11. These washers on their upper faces abut flat spring units 12 and 13. These springs slidably engage the bolts 6 and 7 so as to permit a relative movement of the spring units with respect to the bolts. These flat spring units at one end are provided with slots, such as 14, through which a portion of a screw 15, or similar device, extends. This screw 15 is connected to the cover portion 2. At the other end of the flat spring units 12 and 13 are disposed pivoted latches 16 and 17. The upper ends of these latches are cut away, as shown at 16', to form a sort of yoke between which the ends 17' of the spring units 12 and 13 are received. A bolt or rivet 18' passes through the ends of the yoke member and the end 17' of the spring member to fasten them together. On the lower end of the pivoted latch 16 is a tooth 18. This latch and the tooth are adapted to extend downwardly into a box-like extension 19 disposed at one end of the receptacle 1. This box 19 has on its inner face a plurality of teeth 20 adapted to engage with the tooth 18 on the lower end of the latch 16. The flat spring units 12 and 13 can together be considered as one spring unit extending across the top of the cover. When so considered it will be observed that this one spring unit is fastened at its middle slidable to the cover and is connected at its end portions to latch members, and that intermediate its middle portion and each end a cushioning member is disposed.

The pivoted latch 17 is provided throughout its length with a plurality of teeth 21 which, in various positions of the latch 17, are adapted to engage with a tooth 22 disposed on the body portion 1 near the top thereof.

In the operation of the device, a ham is placed within the receptacle and the cover 2 is forced down on the top of the ham until a certain desired pressure is attained, whereupon the latches 16 and 17 are in a certain relative engagement with the teeth 20 and 22. This engagement holds the cover 2 down on the ham. During the cooking, however, the ham expands, and this expansion forces the cover 2 up against the action of the flat spring units 12 and 13. The inner ends of the spring units, as above described, by reason of the slots 14 are permitted to have a certain relative longitudinal movement with respect to each other during the upward and downward movements of the cover 2. Thus, during the cooking of the ham, substantially the same constant pressure is applied to the ham to cause it to maintain a definite shape and volume. After the ham has been cooked and has cooled, it tends to contract, whereupon the cover portion 2 follows it during its contraction to maintain this pressure thereagainst.

What I claim is:

1. A ham boiler comprising a receptacle, a cover portion telescopically engaging therewith, a latch engaging the receptacle, a flat spring engaging the latch at one end and slidably engaging the cover at the other end, and a resilient cushion between the cover and the flat spring intermediate its length.

2. A ham boiler comprising a receptacle, a cover telescopically engaging therewith, a bolt extending outwardly from said cover, a flat spring slidably engaging the bolt intermediate the length of the spring, resilient means disposed around the bolt and between the cover and the spring, said spring at one end slidably engaging the cover, a latch engaging the other end of the spring, and means on the receptacle for engaging the latch whereby the cover may be resiliently adjusted in any desired position.

3. A ham boiler comprising a receptacle, a cover telescopically engaging therewith, a latch, resilient means connecting the latch with the cover portion, and a boxlike extension on the receptacle having a series of latch-engaging members on the inner face thereof, said latch adapted to be moved into the extension to engage in an adjusted position with the members therein to hold the cover in a desired position relative to the receptacle.

4. A ham boiler comprising a receptacle, a cover telescopically engaging therewith, a plurality of rigid members extending outwardly from the cover portion, a flat spring slidably engaging with each rigid member intermediate the length of the spring, a resilient cushion disposed around the rigid member and between the cover and the flat spring, each of the flat springs having a slot at its inner end, a stud disposed on the cover portion and extending through each of said slots to permit slidable movement of the inner ends of the spring with respect to the cover portion, a latch attached to the outer end of each flat spring, and means on the receptacle to engage with the latch.

HANS ADELMANN.